June 3, 1947. R. L. MULLER 2,421,462
CARBON SHEET HOLDING AND POSITIONING MEANS FOR BUSINESS MACHINES
Filed Jan. 5, 1946 5 Sheets-Sheet 1

INVENTOR.
Robert L. Muller
BY Fidler + Crouse attys

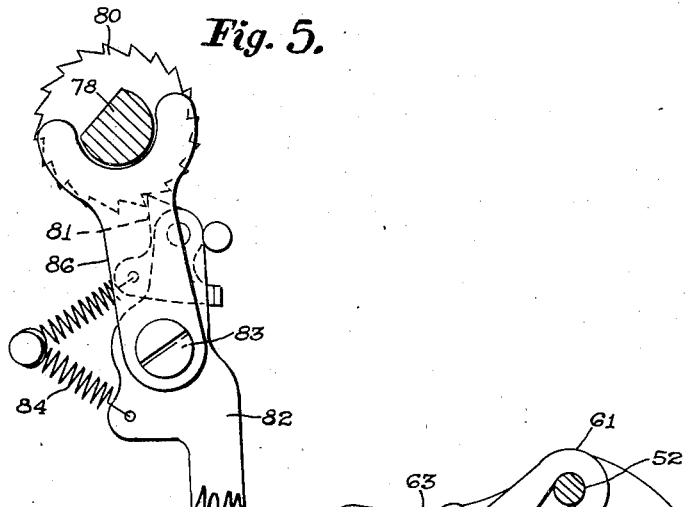
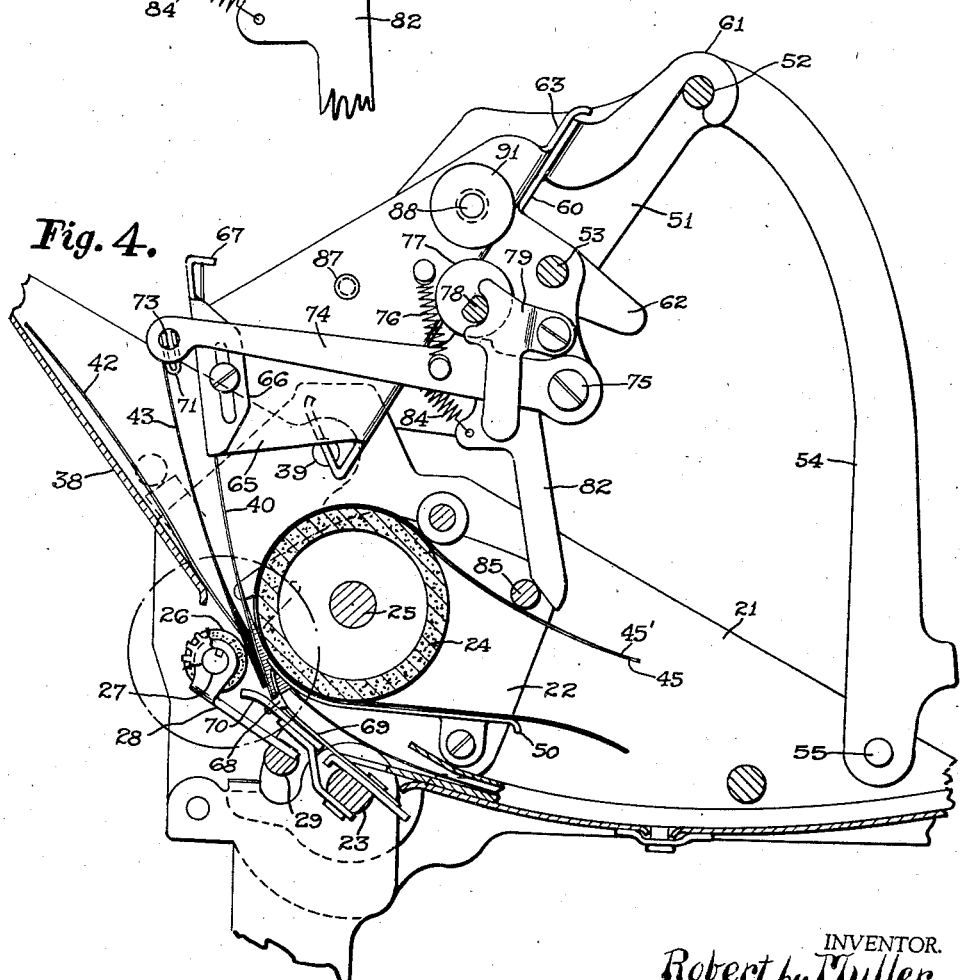

June 3, 1947.  R. L. MULLER  2,421,462
CARBON SHEET HOLDING AND POSITIONING MEANS FOR BUSINESS MACHINES
Filed Jan. 5, 1946  5 Sheets-Sheet 5

INVENTOR.
Robert L. Muller
BY Fidler & Crouse
attys

Patented June 3, 1947

2,421,462

UNITED STATES PATENT OFFICE 2,421,462

CARBON SHEET HOLDING AND POSITIONING MEANS FOR BUSINESS MACHINES

Robert L. Muller, Detroit, Mich., assignor to Burroughs Adding Machine Company, Detroit, Mich., a corporation of Michigan Application January 5, 1946, Serial No. 639,257

4 Claims. (Cl. 197—126)

1

This invention relates to adjustable carbon paper holders for business machines, particularly accounting machines.

In many kinds of accounting machine work, it is necessary to produce a plurality of printed records on forms of varying sizes during a series of machine operations in the posting of each individual account. For example, in pay-roll work, it may be required to print on a pay check the amount of the check and other data and to print the same data together with additional data on the employee's ledger card, and to produce on a stub of the check form and on a journal sheet carbon impressions of at least some of the data printed on the ledger card. The carbon impression on the journal sheet may be produced with the aid of the usual carbon sheet of the same size as the journal sheet and fed around the platen in contact with the journal sheet. That is convenient because the journal sheet remains in the machine until filled. However, the check form with its stub, and the ledger card are removed at the completion of each posting, and another ledger card and a new check form are inserted, there being an individual ledger card for the account of each employee for whom a pay check is to be made out. It is desirable to employ a sheet of carbon paper of appropriate size between the ledger and the check form. This gives rise to some problems concerning the proper positioning of the carbon sheet with the least burden on the machine operator.

Attachments may be provided to hold the carbon paper in a position such that it registers with the check and ledger card or other record forms. However, when the carbon sheet is so positioned that successive groups of entries are duplicated through the same areas of the carbon paper repeatedly, the carbon is quickly removed from those areas and the operator must frequently replace the carbon sheet or detach and re-attach the same carbon sheet in a new position such that the impressions are made through previously unused portions of the sheet. In either case, the operator is burdened with frequent handling of the carbon paper.

The present invention has for its object to provide an improved carbon sheet holding and positioning means which will hold carbon sheets of appropriate size and intermittently shift the carbon sheet relative to the record forms in such manner as to bring different portions of the carbon sheets successively into register with the entry-receiving portions of the forms so as to reduce to a minimum the frequency with which the carbon sheets must be replaced and to make the best use of each carbon sheet with the least burden

2 on the machine operator in the matter of handling the carbon sheets, and incidentally effect a saving in the cost of carbon paper.

Another object is to provide such a carbon sheet holding means which will permit ready adaptation or adjustment to various sizes of record forms and carbon sheets and various arrangements of record forms.

Further objects and advantages of the invention will become apparent from the following detailed description referring to the accompanying drawings which illustrate a preferred form of the invention and in which:

Fig. 4 is a section in a vertical fore and aft plane through the paper carriage and the structure of Fig. 1 and including some additional parts of the paper carriage;

Fig. 5 is a detail view showing a portion of the means for varying the position of the carbon paper;

Fig. 6 is a cross section through a carbon paper supporting member and a clamp member for securing the carbon paper thereto;

Fig. 7 is a further detail of the paper carriage showing means for positively driving the feed rolls to secure.

Figure 1:
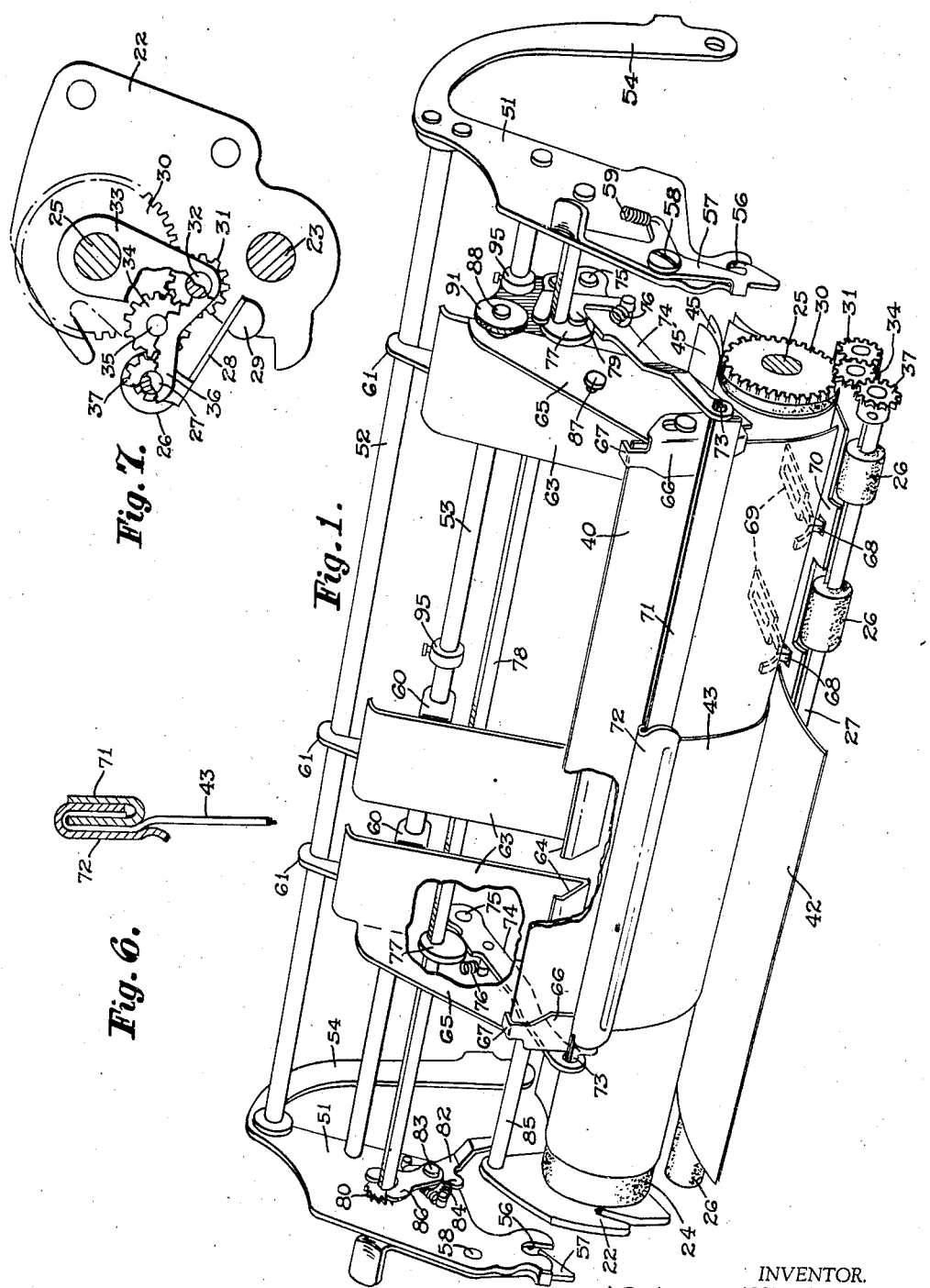
Figure 1 is a perspective view of an attachment embodying the invention, together with portions of the paper carriage of a Burroughs "High-keyboard" machine, some portions of the attachment being broken away or omitted to facilitate clearer illustration.

In the accompanying drawings, the invention has been illustrated as applied to the paper carriage of a Burroughs "High-keyboard" machine, the general features of which, including the construction and operation of the paper carriage, are very well known and will not be described herein except insofar as may be necessary for a clear understanding of the invention.

The main frame of the paper carriage, including the side plates 21 (Figs. 3 and 4) and suitable cross-braces, is supported at the back of the machine for crosswise travel in tabulating and return directions to bring several laterally spaced data-receiving portions of the forms carried in the carriage into alignment with the type bars (not shown) of the printing mechanism which is too well known to require illustration herein. Within the main traveling carriage frame, a platen frame, comprising the side plates 22 and suitable cross-braces, is secured on a shaft 23 which is journalled in the main frame plates 21. The platen roller 24 is carried on a platen shaft 25 journalled in the platen frame plates 22.

Figure 3:
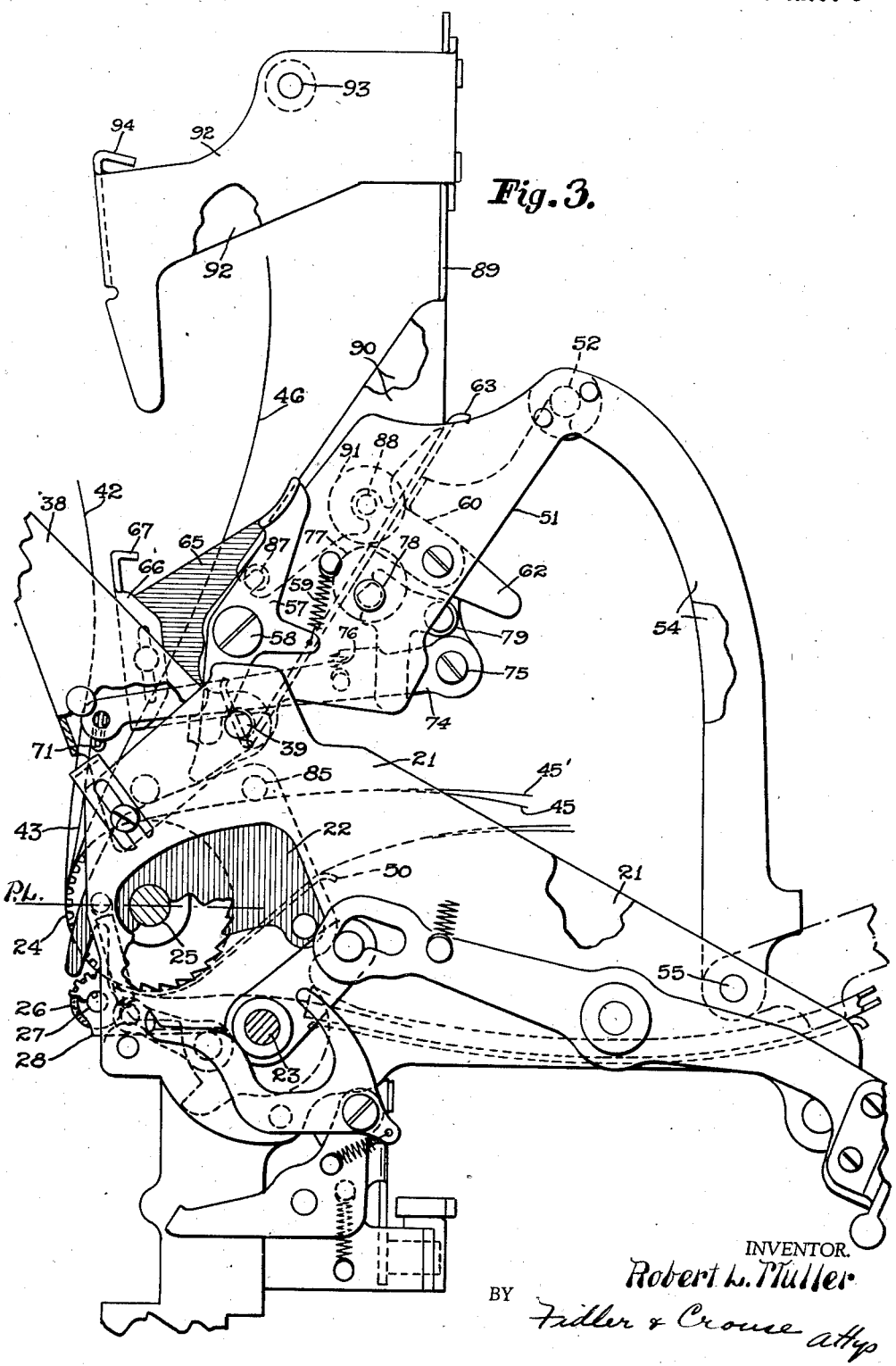
Fig. 3 is an end view of the right hand end of of the structure of Fig. 2, showing additional parts of the paper carriage.

The shaft 23 is rockable by well known means and in a well known manner to swing the platen roller 24 from a printing position closely adjacent the printing type bars to an out-of-printing position upwardly and rearwardly of the printing position. The printing position of the platen is shown in Fig. 3 and indicated in dot-dash lines in Fig. 4 in which the platen is shown in full lines in its out-of-printing position.

To press the work forms against the platen roller, hold them securely during printing operations, and to secure accurate line-spacing thereof by line-spacing rotation of the platen roller, a series of pressure feed rollers 26 are keyed on a shaft 27 rotatably supported in upturned side portions of the forward ends of a series of arms 28 secured on a shaft 29 journalled in the platen frame plates 22. A roller 26 is located between the two side portions of each arm 28 which maintain them in proper positions longitudinally of the shaft 27.

As is well known, the principal purpose of swinging the platen away from printing position is to facilitate the insertion of forms such as ledger cards, checks, statements, etc., which are removed and replaced by other similar forms after each posting, into the paper carriage in an easy manner from the front of the platen. For that purpose, the carriage is provided with well known means, not illustrated, for rocking the shaft 29 to separate the feed rolls 26 from the platen, as shown in Fig. 4 when the platen is moved to its out-of-printing or throw-back or front feed position, and to return the feed rolls 26 into paper gripping relation to the platen when the latter is returned to printing position.

To minimize possible slipping of the work forms relative to each other during line-spacing, the feed rolls 26 are preferably geared to the platen so that the adjacent surfaces will move in the same direction and to the same extent. A gear 30 (Fig. 7) secured on the platen shaft 25 meshes with a wide pinion 31 rotatable on a stud 32 secured in an arm 33 pivotally supported on the platen shaft. The wide pinion 31 also meshes with a pinion 34 which is freely rotatable on a stud 35 secured in a link 36 which is pivoted at one end on the stud 32 and formed at its other end with an aperture in which an end of the shaft 27 is rotatably fitted. The pinion 34 meshes with a pinion 37 keyed on the shaft 27. The feed rollers 26 are thus geared to the platen roller in a manner which does not interfere with the relative movement between the two as the paper throat between them is opened and closed.

To guide the front-fed forms into the paper throat between the feed rolls 26 and the platen 24, a front feed paper chute 38 is pivoted, at the upper rear corners of its side portions on studs 39 secured in the carriage side plates 21. The rear edges of the side portions of the chute 38 rest on the edges of the adjacent side plates 22 of the platen frame so that when the platen is in printing position, the chute 38 is held upward in a nearly vertical position to render the printing line on the work forms visible to the operator beneath the lower edge of the front feed chute, but when the platen is rocked to its out-of-printing or front feed position, the chute falls forwardly and downwardly about its supporting studs 39 into an inclined front-feeding position.

For such further details of the construction and operation the paper carriage and its parts as may be of interest, reference may be had to the Muller Patent 2,202,595 and for other details of the remainder of the machine reference may be had to the many prior patents disclosing the well known Burroughs "High-keyboard" machine and various portions and mechanisms thereof.

Figure 8:
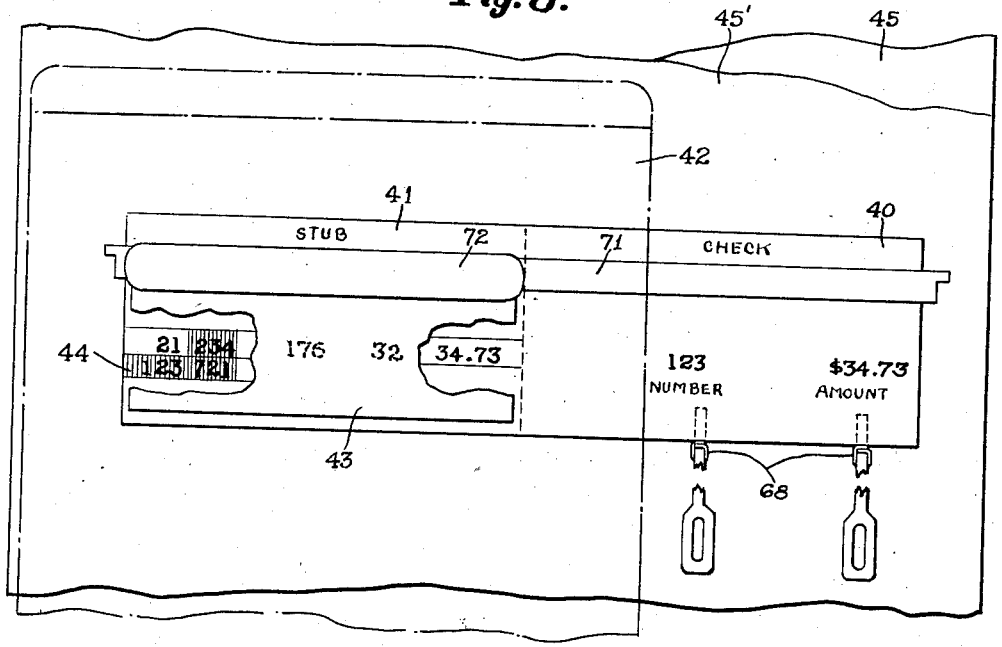
Figs. 8 and 9 illustrate examples of work performed on a machine equipped with the invention.
Figure 9:
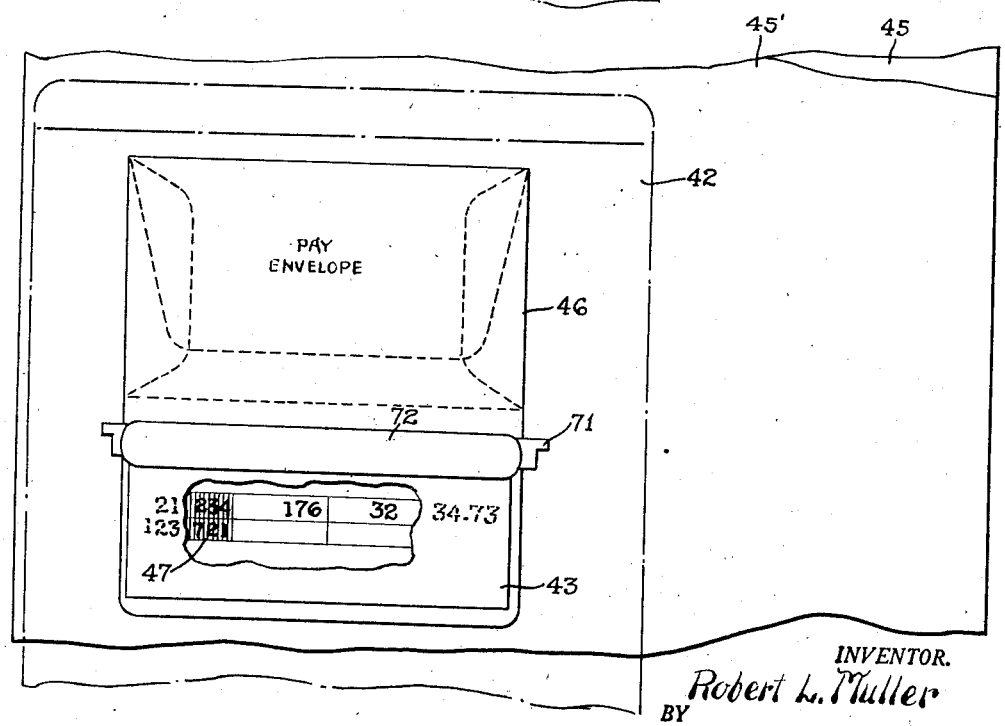

To illustrate examples of advantageous uses of the invention, Figs. 8 and 9 show arrangements of work forms for a common variety of pay-roll work in which it is necessary to prepare for each pay period a series of pay checks, one for each employee of a concern receiving his pay by check, and to prepare a series of pay envelopes, one for each employee receiving his pay in currency. For each employee's pay account, there is a ledger card. For a great number of business concerns, the volume of pay-roll work required to be performed may not be such as to require the use of more than one machine or even to require full time use of a single machine. The disclosed embodiment of the invention is so constructed as will be explained hereinafter that a single machine may be employed both for preparing pay checks and the necessary records thereof as shown in Fig. 8 as well as pay envelopes together with the necessary records pertaining thereto as shown in Fig. 9, and, if desired, also employed for other work.

Fig. 8 shows a generalized representation of a pay check 40 having a stub portion 41. The data to be printed on the check proper, designated 40, includes the check number and the amount of the check as shown. The data required to be printed on the ledger card 42 also includes the amount of the check and certain other data depending upon various circumstances which it is not necessary to consider in detail herein. At least some of the entries printed on the ledger card are also required to be duplicated on the check stub 41. The making of the necessary entries on both the check stub and the ledger card may be accomplished by inserting each ledger card 42 in the carriage in front of the stub portion of the check form whereby the original or ink ribbon impression will be made upon the ledger card itself. The duplication of the necessary entries upon the stub portion 41 of the check is secured by inserting a small sheet 43 of carbon paper between the ledger card and check stub.

Where it is desired that certain of the data entered on the ledger card 42 should not appear upon the check stub 41, appropriate areas on the check stub may be printed solid black so that carbon impressions made thereon will not be visible. Such a portion of the check stub has been indicated at 44 wherein the area has, however, been shown with closely spaced shade lines in order to permit indication of the entries which are printed on corresponding portions of the ledger card and would appear as carbon impressions on the check stub if such portions of the check stub were not printed solid black.

A journal sheet 45, together with a carbon sheet 45', are also positioned around the platen 24, both being of sufficient width to secure carbon duplication upon the journal sheet of all of the entries made on the checks, the check stubs and ledger cards.

When pay envelopes are prepared as illustrated in Fig. 9, the necessary data including the amount of pay to be enclosed in the envelopes, together with the other data which may be of the same character as required to be printed on the stub of a check when payment is made by check, may be printed on the flap of the envelope 46. As is the case when pay checks are prepared, so also when pay envelopes are prepared, the amount of pay, together with the other data appearing on the flap of the pay envelope 46 must also be entered on the corresponding ledger card 42 upon which it may also be desired to make certain entries which should not be visible on the pay envelope. To avoid visible carbon duplications of such entries on the pay envelope appropriate areas 47 of the pay envelope may also be printed solid black. To secure production of the necessary entries on the envelope 46 and record forms, the employee's ledger card 42 is inserted in the carriage in front of the envelope 46 on which the carbon duplication of the desired entries is obtained by means of the small carbon sheet 43 which may be of the same or a different size than that employed in the preparation of pay checks. The journal sheet and journal carbon 45 and 45' may be of the same character as those employed in the preparation of pay checks.

As shown in Figs. 3 and 4, the journal sheet 45 with the carbon sheet 45' over it, are passed around the platen, being inserted from the rear above a journal guide 50. The check form 40 with its stub 41, or the pay envelope 46 with its flap lower-most, is inserted from above and in front of the platen immediately in front of the journal carbon 45' and the carbon sheet 43 is supported in position immediately forward of the stub 41 of the check form 40 or in front of the flap of the envelope 46 by means to be described hereinafter. The ledger sheet 42 is inserted downwardly in front of the carbon 43 with the aid of the front feed paper chute 47. As the pressure rolls 26 are moved against the platen when the platen is returned to printing position the lower edges of the check form and stub or the lower edge of the flap of the envelope together with the lower edge of the carbon sheet 43 are gripped between the ledger sheet 42 and journal carbon 45' by the pressure of the feed rolls 26 against the platen 24.

In the embodiment illustrated in the accompanying drawings the invention has been incorporated in a structure attachable to the paper carriage of the Burroughs "High-keyboard" machine. The attachment comprises a pair of side plates 51 (Figs. 1 to 4) connected in spaced relation by a pair of cross rods 52 and 53. Side plates 51 have rearwardly and downwardly extending arms 54 having at their lower ends apertures to receive supporting studs 55 secured upon and extending inwardly from the rear portions of the side frame plates 21 on the paper carriage whereby the plates 51 and the structure carried thereby are detachably pivotally connected to the paper carriage. The forward lower portions of the plates 51 are formed with notches 56 to fit over the respective studs 39. Latch members 57 pivoted on studs 58 secured in the plates 51 are urged by springs 59 to engage their lower hook portions under the studs 39 to releasably latch the lower forward portions of the plates 51 to the studs 39. The operator may, whenever desirable, manually rock the latches 57 to disengage them from the studs 39 and thereafter either swing the entire attachment rearwardly about the studs 55 as, for example, to permit easy insertion of a new journal sheet 45 and journal carbon 45' around the platen 24. By also springing the arms 54 inwardly to disengage them from studs 55, the attachment may be completely detached and removed from the machine as, for example, to facilitate the performance of some other variety of work upon the machine.

The cross rods 52 and 53 of the attachment support a plurality of devices to facilitate the handling of the check forms and pay envelopes. These devices comprise a number of yoke-shaped members 60 having rearwardly turned side arms formed with apertures whereby they may be movably mounted on the cross rod 53. Each yoke member 60 also has a rearwardly bent upward extension terminating in a hook portion 61 adapted to hook over the rod 52 so as to prevent the member 60 from rocking on the rod 53.

To the rearward or inner side of the forward transverse portion of each of the yoke members 60, there is secured the forward transverse portion of a yoke-shaped spring member 62 having rearwardly extending spring arms also formed with apertures through which the rod 53 extends. Such apertures in the rearward arms of the spring members 62 are so dimensioned and located that when the spring arms are permitted to spread laterally apart toward the respective side arms of the yoke members 60, they bind upon the rod 53 so as to hold the yoke members 60 frictionally in adjusted position longitudinally along the rod 53. Whenever the two rearwardly extending arms of a spring clamping member 62 are pressed toward each other by the fingers of the operator, the yoke 60 is released for free adjustment along the rod 53.

A check supply supporting member 63 comprising a back plate and a lower forwardly and upwardly extending portion 64 is secured to each of the yoke members 60, preferably by the same securing means, such as rivets, which secure the respective spring clamps 62 to the yoke members. The right and left hand outer-most two of the members 63 also have at their right and left hand sides, respectively, forwardly extending side portions 65 which serve not merely to confine the check forms laterally as they are held in the supply holder, but also serve to guide the checks as they are manually inserted one by one into printing position in front of the platen. Each side member 65 also has adjustably secured to its forward end, as by means of stud and slot connections, an angularly shaped guide device 66 which extends laterally in front of the inserted check form and also has an upward extension with a rearwardly bent portion 67 to serve as a gauging stop to hold the manually inserted check form in accurately aligned position with the cooperation of lugs 68 (Figs. 1 and 4) on spring members 69 which are adjustably secured to the shaft 23 at points to the right of the position occupied by the inserted ledger card. The right hand adjustable stop 67 is so positioned relative to the stop lugs 68 as to so hold an inserted check form between them as to prevent the left hand or stub portion of the check form from dropping downwardly away from the left hand stop 67. The lugs 68 project into apertures in a guide plate 70 also carried by the shaft 23 and flaring away from the ends of the members 69 so as to guide the lower edge of the inserted check form against the stops 68.

The upper edge of the carbon sheet 43 is, as illustrated in Fig. 6, inserted in the channel in a carbon supporting member 71 of upwardly open U-shaped cross section and bent downwardly in front of the member 71 after which a clamping member 72 of downwardly opening generally U-shaped cross section is positioned with its rear portion inserted in the channel of the member 71 behind the inserted edges of the carbon sheet. The member 72 has sufficient resilience and is so formed and dimensioned as to clamp the carbon sheet to the member 71. The member 71 is formed at its ends with lugs 73 which engage in apertures the forward ends of arms 74 which at their rear ends are pivoted on studs 75 secured in the outer sides of downward and rearward extensions of the outer-most side arms of the two outer-most yoke members 60. The arms 74 are urged upwardly by springs 76 (Figs. 1 and 4) which tend to hold abutment portions on the upper edges of the arms 74 against the edges of cam discs 77 which have eccentrically located non-circular openings therein formed to fit the non-circular cross section of a shaft 78 which is journalled at its ends in the plates 51 and on which the cam discs 77 are thus non-rotatably but nevertheless longitudinally movably carried. On the outer side of the outer-most side arm of each of the two outer-most yokes 60 there is also secured a retaining piece 79 which has a forwardly extending portion notched to straddle the shaft 78 without interfering with the rotation thereof and a projection extending downwardly on the outer side of the respective arm 74. The retaining piece serves to maintain the cam 77 and co-operating arm 74 in alignment at the side of the yoke member 60 as the latter may be adjusted from time to time transversely of the machine along the rod 53.

On the inner side of the left hand plate 51, a ratchet wheel 80 (Figs. 1, 2 and 5) is keyed on the shaft 78. A spring biased drive pawl 81 (Fig. 5) cooperating with the ratchet wheel 80 is pivoted on the upper end of a lever 82 which is pivoted on a stud 83 secured in the plate 51. The lever 82 is urged clockwise, as viewed from the right side of the machine, by a spring 84 which yieldingly maintains the lower arm of the lever 82 in engagement with the rear side of one, 85, of the cross brace rods connecting the side plates 22 of the platen frame together. The drive pawl 81 and ratchet 80 are maintained in alignment by a retaining member 86 which is secured at its lower end on the stud 83 and is notched at its upper end to straddle the shaft 78.

It will be apparent that upon each rocking of the platen frame to move the platen 24 to its front feed or out-of-printing position, the rod 85 of the platen frame will rock the lever 82 to cause the pawl 81 to advance the ratchet wheel 80 and shaft 78 a short distance clockwise as viewed from the right hand end of the shaft. The eccentric cams 77 rotating with the shaft 78 and in cooperation with the springs 76 will thus vary the vertical positions of the front ends of the arms 74 and of the carbon paper supporting member 71.

The parts are so proportioned that a series of successive prints on the ledger cards will be duplicated through different portions of a substantial area of the carbon sheet 43, the successive impressions being so distributed over such areas of the carbon paper as to make good use of the carbon coating on the whole area whereby the carbon coating on the paper is not quickly removed from any given spot so as to render it necessary to frequently manually adjust or replace the carbon paper. By effecting such efficient use of the carbon sheet a very significant saving is made in the time and attention required of the operator.

Figure 2:
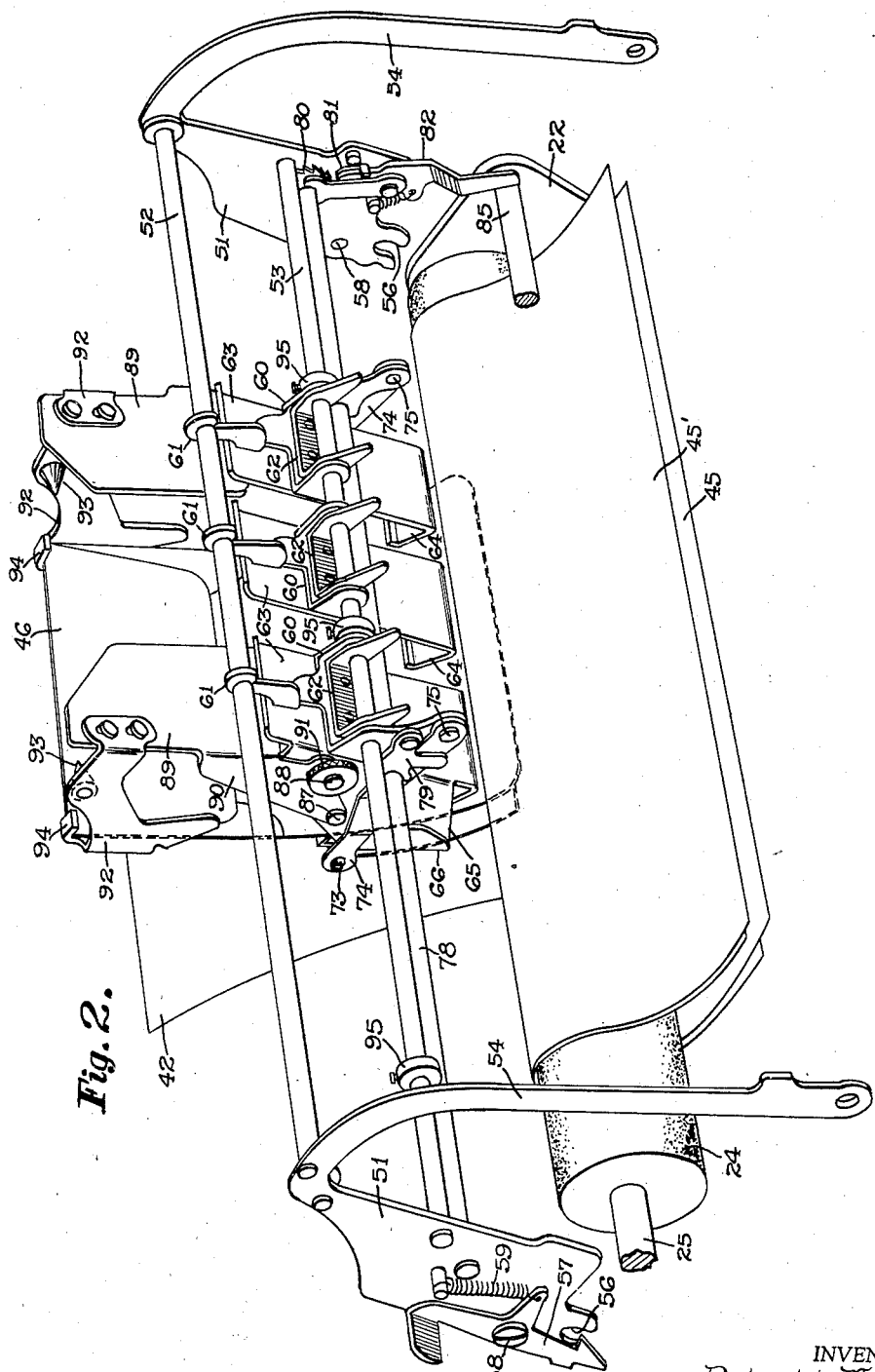
Fig. 2 is a perspective from the rear above and right of the structure of Fig. 1, showing additional parts provided to facilitate the handling of pay envelopes.

The structure thus far described is sufficient for use in the preparation of pay checks with the work forms arranged as indicated in Fig. 8. However, when pay envelopes are to be prepared, it is desirable to provide additional supporting and guiding means for the envelopes as shown in Figs. 2 and 3. For that purpose, the side portions 65 of the outer-most members 63 are each provided with two studs 87 and 88 to support a respective one of two members 89 each having a back portion to support a supply of pay envelopes 46 from the rear and each having a forwardly bent and downwardly extending side arm 90 formed with a pair of notches as shown in Fig. 3 spaced in conformance with the spacing of the studs 87 and 88, the forward lower notch opening in a downwardly and forwardly inclined direction and the upper rearward notch opening in a downward and rearward direction at right angles to the direction of opening of the forward notch whereby the members 89, 90 may first be positioned with their lower forward notches over the studs 87, and then rocked rearwardly to engage the studs 88 in their upper rearward notches. Then, knurled nuts 91, threaded on each of the studs 88, may be tightened to clamp the members 89, 90 securely in place.

The back portion of each of the members 89 has adjustably secured thereto, as by stud and slot connections, the inwardly bent flange of a member 92 which extends forwardly from the outer-most side edge of the respective member 89. Each of the members 92 has on its inward side a conical stud or projection 93. The studs 93 normally retain the supply of pay envelopes confined rearwardly thereof. The lower edges of the flaps of the envelopes 46 rest on the upwardly inclined forwardly extending flanges 64 of the member 63 causing the envelopes to be stacked in somewhat staggered or "feathered" relation so that the foremost envelope may easily be picked off of the stack by the operator's finger and pulled forwardly past the studs or projections 93.

The forward ends of the members 92 are bent laterally inwardly and have upward extensions which are bent over rearwardly to provide gauge stops 94 against which the upper corners of the envelope may be placed to secure correct alignment of the envelope with the other work forms in the carriage.

When checks of the character of Fig. 8 are being prepared, the length of the check and the stub require a relatively wide spacing between the guides 65 and thus, also, between the levers 74 and, therefore, also require a relatively long carbon paper supporting member 71. When changing over from the preparation of pay checks to the preparation of pay envelopes, it is desirable to adjust at least the right hand members 63, 65 to reduce the spacing between the guides 65 and thus also to reduce the lateral spacing between the members 92 to correspond to the narrower width of the pay envelopes and thereby facilitate the handling and proper aligning of the envelopes. Relative adjustment between the members 63, 65 and between the members 92, results in a similar relative adjustment of the arms 74 in view of which the long carbon supporting member 71 will first be detached from the arms 74 before making such lateral relative adjustment of the members 65 and 92. A shorter carbon supporting member 71' as indicated in Fig. 9 may then be inserted in the apertures in the arms 74.

To facilitate rapid changeover from pay check handling condition to pay envelope handling condition a number of stop collars 95 are placed on the rod 53, each collar 95 being adapted to be secured in any adjusted position on rod 53 by means of a set screw or the like. One such collar 95 is provided to serve as a stop to limit the leftward movement of the left-most yoke 60. In the particular example of work illustrated, there would be no need to adjust the left-most yoke 60 which should, therefore, be left always engaged against the left-most collar 95. A middle collar 95 is provided to limit leftward movement of the most rightward yoke 60, and a third collar 95 is provided to limit rightward adjustment of the last mentioned yoke 60.

When it is desired to adjust the device for the handling of pay checks, the operator merely moves the right hand yoke 60 rightwardly into engagement against the right hand stop collar 95 and inserts the longer carbon supporting member 71 in the forward ends of the arms 74. The members 89 and 92 may readily be removed by simply loosening the knurled nuts 91, and then swinging the members 89, 92 forwardly and removing them upwardly. When it is desired to adjust the parts for the handling of pay envelopes, the operator will merely remove the long carbon supporting member 71, then move the right hand yoke member 60 leftwardly into engagement against the middle stop collar 95, insert the shorter carbon supporting member 71' and finally replace the members 89, 92, and secure them in place by tightening the knurled nuts 91.

From the foregoing, it will be apparent the invention provides a carbon sheet holding and positioning means which permits of readily adapting the machine for different kinds of work employing different sizes of forms. The illustrated structure is furthermore easily completely removable from the machine to permit of conveniently employing the machine for still other kinds of work not requiring the use of the carbon holder. It should be noted, however, that the above described form of structure has been disclosed by way of example only and that it is capable of various modifications within the scope of the invention as defined in the appended claims.

I claim:

1. Carbon sheet holding and positioning means for a printing business machine having means to receive front-fed work-forms and support them in printing position, said receiving and holding means having portions movable from front-feed position to printing position and reversely, said carbon sheet holding and positioning means comprising means to releasably hold a carbon sheet by its upper edge portion to suspend it with a portion thereof between impression receiving areas of superposed front-fed work-forms, said holding means being supported for upward and downward movement, means to urge said holding means upwardly, adjustable stop means to limit upward movement of said holding means by said urging means, and means actuated by one of said movable portions of said work-form receiving and holding means upon movement thereof to adjust said stop means to vary the position of said carbon sheet relative to said impression receiving areas.

2. Carbon sheet holding and positioning means for a printing business machine having means, including a platen roller, to receive front-fed work-forms and support them in printing position, said receiving and supporting means having portions movable from a printing position to a front-feed position and reversely to facilitate insertion of work-forms from in front of said platen, said carbon sheet holding and positioning means comprising cam discs, pivoted arms urged to engage the peripheries of respective ones of said cam discs, means supported by said arms to support a carbon sheet in a printing area relative to said platen, and means actuated by a movable portion of said work-form receiving and supporting means as it moves from one to the other of said positions, to rotate said cam discs to shift said carbon sheet relative to said printing area.

3. Carbon sheet holding and positioning means for a printing business machine, comprising a pair of paper guide devices mounted for adjustment laterally toward and from each other, a carbon sheet carrier to suspend a carbon sheet by its upper edge, a rotatable shaft, a pair of cam discs rotatable with said shaft and movable longitudinally thereof, supporting members detachably supporting said carrier and each mounted on a respective one of said guide devices for movement to adjust said carrier upwardly and downwardly and each urged to engage a respective one of said cam discs, means to rotate said shaft, and means to maintain said cam discs in working alignment with the respective supporting members as said guide devices are adjusted laterally.

4. Carbon sheet holding and positioning means for a printing business machine, having means, including a platen roller, to receive front-fed work-forms and support them in printing position, said receiving and supporting means having portions movable from a printing position to a front-feed position to facilitate insertion of work-forms from in front of said platen, and a pair of paper guide devices mounted for adjustment laterally toward and from each other, said carbon sheet holding and positioning means comprising a carbon sheet carrier to suspend a carbon sheet by its upper edge, in a printing area relative to said platen, a rotatable shaft, a pair of cam discs rotatable with said shaft and movable longitudinally thereof, supporting members detachably supporting said carrier and each mounted on a respective one of said guide devices for movement to adjust said carrier upwardly and downwardly and each urged to engage a respective one of said cam discs, means actuated by one of said movable portions of said work-form receiving and supporting means upon movement thereof, to rotate said shaft, to vary the position of said carbon sheet relative to said printing area, and means to maintain said cam discs in working alignment with the respective supporting members as said guide devices are adjusted laterally.

ROBERT L. MULLER.

REFERENCES CITED

The following references are of record in the file of this patent:

UNITED STATES PATENTS

| Number | Name | Date |
|---|---|---|
| 1,448,335 | Crossitt | Mar. 13, 1923 |
| 2,048,188 | Clarkson-Jones | July 21, 1936 |
| 2,239,640 | Anderson | Apr. 22, 1941 |
| 2,349,693 | Anderson | May 23, 1944 |
| 2,363,989 | Pittman | Nov. 28, 1944 |